US012748833B2

(12) United States Patent
Sato

(10) Patent No.: US 12,748,833 B2
(45) Date of Patent: Sep. 29, 2026

(54) PASSWORD SETTING METHOD AND INFORMATION PROCESSING DEVICE

(71) Applicant: Oki Electric Industry Co., Ltd., Tokyo (JP)

(72) Inventor: Kimitoshi Sato, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 86 days.

(21) Appl. No.: 18/739,854

(22) Filed: Jun. 11, 2024

(65) Prior Publication Data

US 2024/0427874 A1 Dec. 26, 2024

(30) Foreign Application Priority Data

Jun. 23, 2023 (JP) ................................ 2023-103486

(51) Int. Cl.
*G06F 21/45* (2013.01)

(52) U.S. Cl.
CPC .................................... *G06F 21/45* (2013.01)

(58) Field of Classification Search
CPC ........ G06F 21/608; G06F 21/46; G06F 21/45; G06F 21/71; G06F 3/1222; G06F 3/1238; G06F 3/1292
See application file for complete search history.

(56) References Cited

U.S. PATENT DOCUMENTS 6,145,085 A * 11/2000 Tran ........................ G06F 21/31 726/5
8,031,349 B2 * 10/2011 Wang .................... G06F 21/608 713/168
10,146,943 B2 * 12/2018 Joshi ..................... G06F 21/572
11,734,413 B2 * 8/2023 Ogasawara ......... G06F 11/3079 726/18
2008/0074690 A1 * 3/2008 Sawada ................. G06F 21/608 358/1.14
2018/0285558 A1 * 10/2018 Neumann ........... H04W 12/068
2021/0382983 A1 * 12/2021 Ogasawara ............ G06F 21/31
2022/0239799 A1 * 7/2022 Hosoda .................. G06F 21/31

FOREIGN PATENT DOCUMENTS

JP 2016-170694 A 9/2016
WO WO-2010050192 A1 * 5/2010 .......... H04L 63/083

* cited by examiner

*Primary Examiner* — Lizbeth Torres-Diaz
(74) *Attorney, Agent, or Firm* — Rabin & Berdo, P.C.

(57) ABSTRACT

The object is to improve convenience of password management. When a password is inputted to a target device, the inputted password is recorded in/on a medium separate from the target device, and the inputted password is applied to the target device when the recording of the password in/on the medium is finished.

20 Claims, 5 Drawing Sheets

PASSWORD SETTING METHOD AND INFORMATION PROCESSING DEVICE

The present application is based on, and claims priority from, JP Application Serial Number 2023-103486, filed Jun. 23, 2023, the disclosure of which is hereby incorporated by reference herein in its entirety.

TECHNICAL FIELD

The present invention relates to a password setting method and an information processing device.

BACKGROUND ART

For an information processing device connected to a network or the like, a password is generally used as a security measure. Conventionally, as such an information processing device, Yamashita discloses, in Japanese Patent Application Publication No. 2016-170694, an information processing device that prevents a user from forgetting to set the password by prompting the user to set the password when the power of the information processing device is turned on for the first time.

SUMMARY OF THE INVENTION

Problem to be Solved by the Invention

From the viewpoint of security, it is desirable to set not an easily guessable character string such as “password” but a character string hard to guess as the password. However, when a character string hard to guess is set as the password, it is possible that the actual person who set the password forgets the password, for example, so that there is a problem in terms of password management.

It is therefore an object of one or more aspects of the present disclosure made in consideration of the above-described issues is to propose a password setting method and an information processing device that improve convenience of the password management.

Means for Solving the Problem

An information processing device in the present disclosure includes an input I/F configured to receive an input of a password; and processing circuitry. The processing circuitry configured to cause the inputted password to be recorded in/on a medium being portable; and to apply the inputted password when the recording of the password in/on the medium is completed.

In a password setting method in the present disclosure, when a password is inputted to a target device, the inputted password is recorded in/on a medium separate from the target device, and the inputted password is applied to the target device when the recording of the password in/on the medium is completed.

Effect of the Invention

According to the one or more aspects of the present disclosure, a password setting method and an information processing device that improve the convenience of the password management can be realized.

DETAILED DESCRIPTION OF THE INVENTION

Embodiments will be described in detail below by using the drawings.

1. First Embodiment

1-1. Configuration of Image Forming Device

Figure 1:
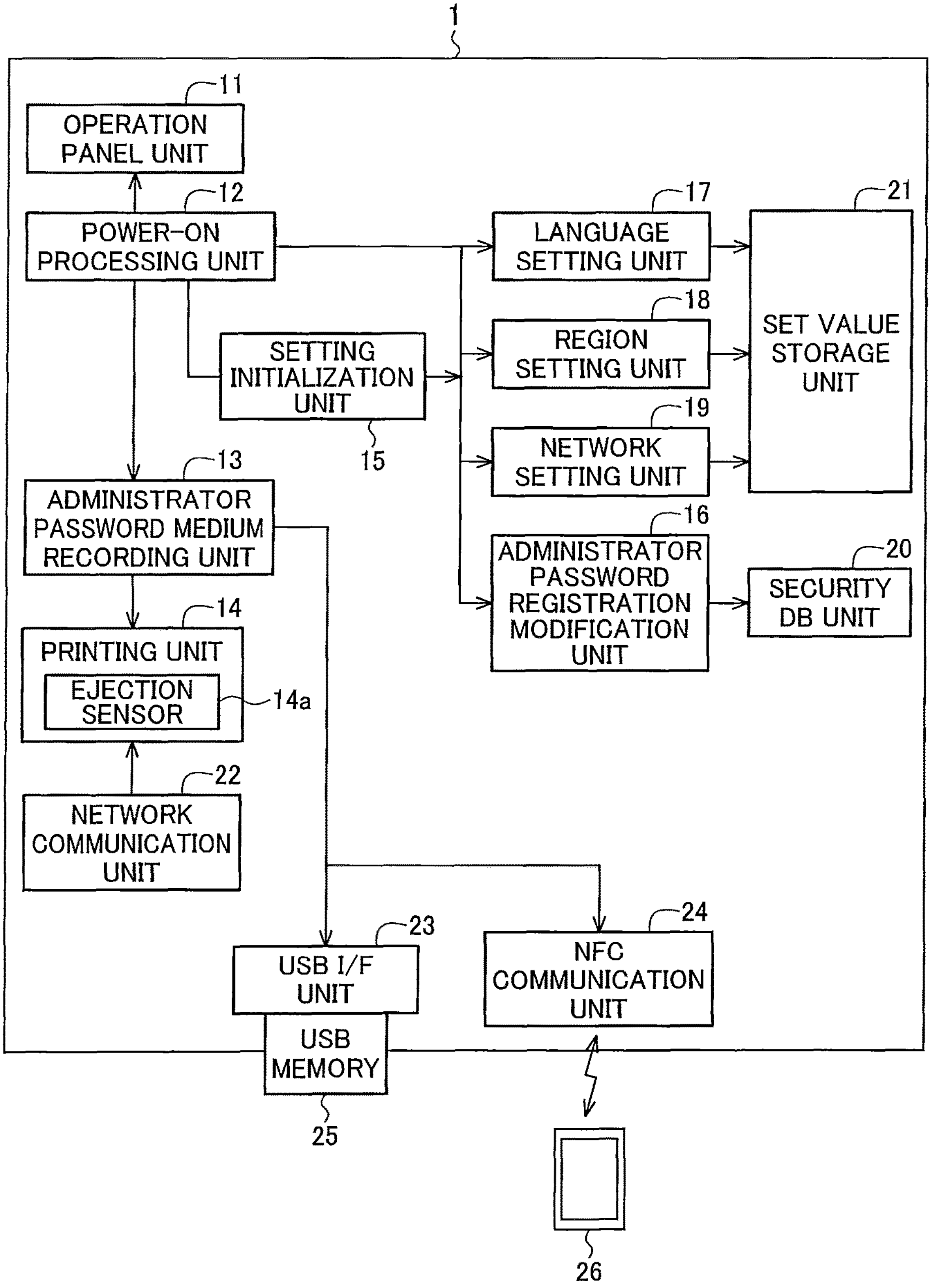
FIG. 1 is a block diagram showing the functional configuration of an image forming device according to a first embodiment.

FIG. 1 is a schematic diagram showing the configuration of a principal part of an image forming device 1 according to a first embodiment. This image forming device 1 is a printer connectable to a network such as a local area network (LAN). This image forming device 1 includes an operation panel unit 11, a power-on processing unit 12, an administrator password medium recording unit 13, a printing unit 14 as an image forming main body or a printing main body, a setting initialization unit 15, an administrator password registration modification unit 16, a language setting unit 17, a region setting unit 18, a network setting unit 19, a security database (DB) unit 20, a set value storage unit 21, a network communication unit 22, a universal serial bus (USB) I/F unit 23 as a connection unit, and an near field communication (NFC) communication unit 24 as a wireless communication unit.

The operation panel unit 11 is formed with an operation unit as an input I/F such as switches, keys, buttons, a touch panel or the like for letting a user input commands to the image forming device 1 and a display unit as a display such as an LED that indicates status of the image forming device 1 or a liquid crystal display that displays various screens.

For example, the operation panel unit 11 receives the input of the password.

The power-on processing unit 12 executes a power-on process when the power of the image forming device 1 is turned on. In this power-on process, when the power of the image forming device 1 is turned on for the first time, the power-on processing unit 12 makes a request, in a wizard format via a screen displayed on the operation panel unit 11, to the user to make various settings. Here, as types of the various settings made in the power-on process, there are an administrator password setting of setting an administrator password, a language setting of setting the language to be used, a region setting of setting a region of use, a network setting for connecting to a network, and so forth, for example.

When set values of the various settings have been set on the setting screen by the user, the power-on processing unit 12 provides each of the set values to the administrator password registration modification unit 16, the language setting unit 17, the region setting unit 18 or the network setting unit 19 depending on the type of the set value. Incidentally, the setting of the set values mentioned here means inputting or selecting the set values.

The administrator password registration modification unit 16 registers (stores) the provided set value (in this case, the administrator password) in the security DB unit 20. Incidentally, the administrator password is information necessary when the image forming device 1 is used in a predetermined condition (specifically, administrator mode), and is applied to the image forming device 1 from the time point when the administrator password is registered in the security DB unit 20, and it becomes possible for the user to use the image forming device 1 in the administrator mode. Put another way, in the image forming device 1, after the administrator password is registered in the security DB unit 20, the user is allowed to use the image forming device 1 in the administrator mode by inputting the administrator password.

If the user forgets the administrator password, the login in the administrator mode becomes impossible and there are cases where repair become necessary. Therefore, it is important in the image forming device 1 to manage the administrator password so that the user does not forget the administrator password.

The language setting unit 17 stores the set value sent thereto (in this case, the set value indicating the language to be used) in the set value storage unit 21. The region setting unit 18 stores the set value sent thereto (in this case, the set value indicating the region of use (time zone)) in the set value storage unit 21. The network setting unit 19 stores the set value sent thereto (in this case, the set value indicating the network setting) in the set value storage unit 21.

Further, the power-on processing unit 12 at the start of the power-on process inquires of the administrator password registration modification unit 16 the registration status of the administrator password (in this case, whether or not the administrator password has already been registered in the security DB unit 20). In response to this inquiry, the administrator password registration modification unit 16 obtains the registration status of the administrator password by checking whether or not the administrator password has been registered in the security DB unit 20, and replies to the power-on processing unit 12 with the registration status.

When the registration status of the administrator password received from the administrator password registration modification unit 16 indicates that administrator password is unregistered, the power-on processing unit 12 requests the setting initialization unit 15 to initializes the various set values. In response to the request from the power-on processing unit 12, the setting initialization unit 15 issues an initialization request to the administrator password registration modification unit 16, the language setting unit 17, the region setting unit 18 and the network setting unit 19. In response to the initialization request, the administrator password registration modification unit 16, the language setting unit 17, the region setting unit 18 and the network setting unit 19 initialize the various set values. Incidentally, to initialize a set value means, for example, to return the set value to a default value or to return the set value to a state in which no value has been set.

Namely, the power-on processing unit 12 is configured to initialize the various settings and then request the user to make the various settings including the administrator password in the case where the administrator password is still unregistered at the time of turning on the power.

The administrator password medium recording unit 13 generates medium recording data indicating the administrator password that has been set by the user (or the administrator). In this embodiment, the administrator password medium recording unit 13 is configured to generate image data for printing the administrator password, indicating the administrator password and identification information (such as model name, serial number, or IP address) for identifying the image forming device 1, as the medium recording data. The medium recording data (the image data for printing the administrator password) generated by the administrator password medium recording unit 13 is provided to the printing unit 14.

Upon receiving the image data for printing the administrator password from the administrator password medium recording unit 13, the printing unit 14 executes printing (recording) on a print sheet as the medium based on the image data, and ejects the print sheet after undergoing the printing to a non-illustrated stacker provided on the image forming device 1. As above, the image forming device 1 is configured to be capable of printing the administrator password that has been set by the user on the print sheet so that the user does not forget the administrator password. Here, the medium is assumed to be an object separate from the image forming device 1 and having portability of being portable separately from the image forming device 1.

Further, the printing unit 14 is configured to feed as a reply at the time of the printing to the administrator password medium recording unit 13 a printing execution result indicating whether or not the printing has been executed normally. Incidentally, the image forming device 1 is configured to execute the printing on the print sheet while conveying the print sheet along a conveyance path formed inside the image forming device 1 and eject the print sheet after the printing to the stacker. An ejection sensor 14*a* for sensing the print sheet is provided in the vicinity of an ejection port of the conveyance path (namely, in the vicinity of the stacker), and the printing unit 14 determines whether the printing has been executed normally or not based on the result of the sensing by the ejection sensor 14*a*. Specifically, at the time of the printing, if the print sheet is sensed by the ejection sensor 14*a* within a predetermined time, for example, the printing unit 14 determines that the printing has been executed normally (in other words, the print sheet is in a state in which it can be carried away from the image forming device 1) since the print sheet was ejected within the predetermined time, whereas if the print sheet is not sensed by the ejection sensor 14*a* even after the elapse of the predetermined time, the printing unit 14 determines that the printing has not been executed normally (in other words, the print sheet is in a state in which it cannot be carried away from the image forming device 1) since the print sheet was not ejected even after the elapse of the predetermined time.

Furthermore, the printing unit 14 is configured also to execute printing on a print sheet based on print data when the print data is received via the network communication unit 22 from a host device such as a PC connected to the network.

The network communication unit 22 connects to the network such as a LAN. Incidentally, the aforementioned network setting is information necessary for the network communication unit 22 to connect to the network. The USB I/F unit 23 is a connection I/F that connects to a USB device such as a USB memory. Incidentally, FIG. 1 shows an example in which a USB memory 25 is connected to the USB I/F unit 23. The NFC communication unit 24 is a wireless communication I/F that executes short-range wireless communication according to NFC with a communication terminal 26 such as a smartphone, for example. The configuration of the principal part of the image forming device 1 is as described above.

1-2. Operation of Image Forming Device

Next, the operation of the image forming device 1 will be described below. Incidentally, main operations of the image forming device 1 include an operation at the time of turning on the power and an operation when executing the printing based on print data received from the host device. Out of these operations, the operation when executing the printing based on print data received from the host device is a generic operation, and thus description thereof is omitted here. Thus, the operation at the time of turning on the power will be described here by using a flowchart shown in FIG. 2 as the operation of the image forming device 1.

Incidentally, the operation at the time of turning on the power is an operation executed mainly by the power-on processing unit 12. When the power of the image forming device 1 is turned on (namely, when the image forming device 1 is powered on), the power-on processing unit 12 starts the power-on process and checks whether or not the administrator password has already been registered (namely, whether or not the administrator password has already been recorded in the security DB unit 20) in step SP21 shown in FIG. 2. Specifically, the power-on processing unit 12 checks whether the administrator password has already been registered or not by inquiring of the administrator password registration modification unit 16 the registration status of the administrator password.

Here, if the administrator password has already been registered, it means that the administrator password has already been registered and the various settings were also made at the time of registering the administrator password. In this case, the power-on processing unit 12 obtains a positive result in the step SP21 and ends the power-on process.

In contrast, if the administrator password is still unregistered, the power-on processing unit 12 obtains a negative result in the step SP21 and advances to step SP22. In the step SP22, the power-on processing unit 12 executes the initialization of the various set values. Specifically, the power-on processing unit 12 requests the setting initialization unit 15 to initialize the various set values. In response to the request, the setting initialization unit 15 issues the initialization request to the administrator password registration modification unit 16, the language setting unit 17, the region setting unit 18 and the network setting unit 19. Accordingly, the initialization of the various set values (in this example, the set values of the administrator password, the language setting, the region setting and the network setting) is carried out. Incidentally, the initialization of the administrator password may be omitted since the administrator password is still unregistered at this time point.

Figure 3:
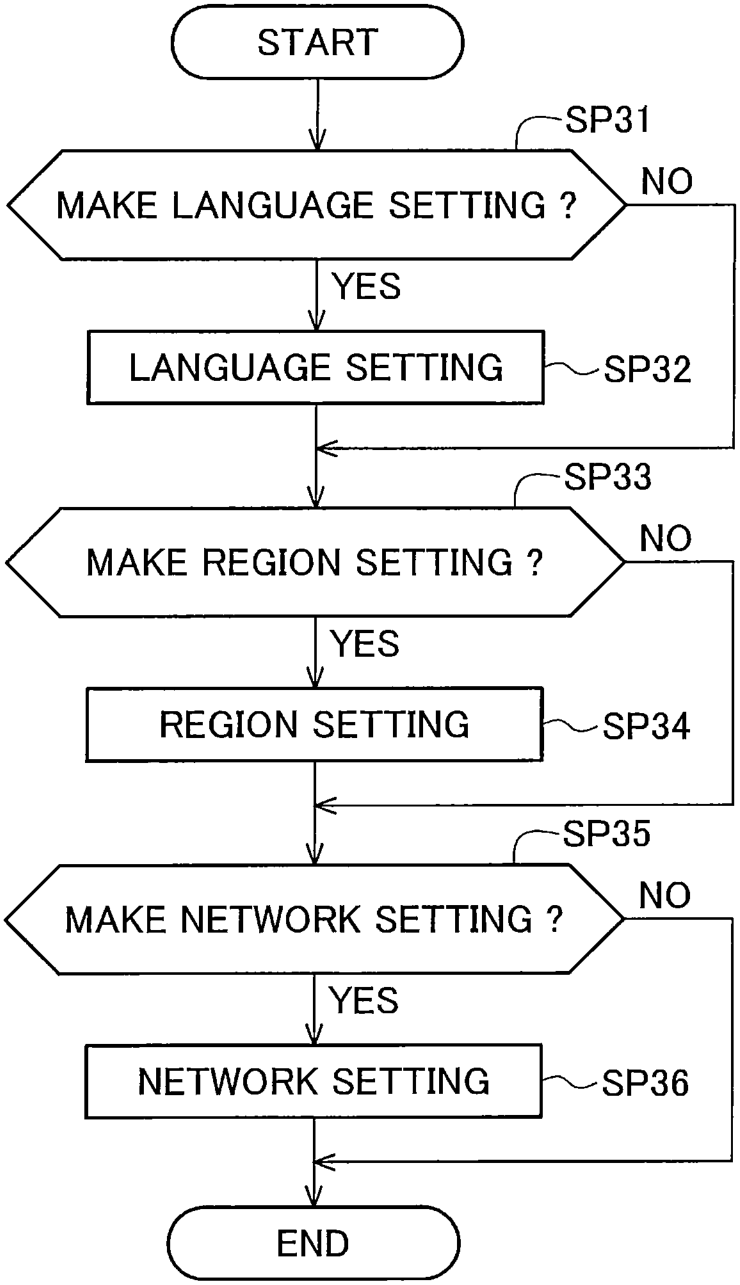
FIG. 3 is a flowchart showing a detailed operating procedure of an initialization-time setting change included in the operating procedure at the time of turning on the power shown in FIG. 2.

In the subsequent step SP23, the power-on processing unit 12 makes a setting change of the various settings excluding the administrator password (referred to as an initialization-time setting change). Here, the initialization-time setting change made by the power-on processing unit 12 will be described below by using a flowchart shown in FIG. 3.

The power-on processing unit 12 starting the initialization-time setting change process first inquires of the user whether to make the language setting or not in step SP31. Specifically, the power-on processing unit 12 causes the operation panel unit 11 to display a screen for requiring the user to select whether or not to make the language setting, and determines whether the user has selected to make the language setting or selected not to make the language setting based on an operation performed on the operation panel unit 11.

Here, when the user has selected not to make the language setting, the power-on processing unit 12 obtains a negative result in the step SP31 and advances to step SP33 while omitting the language setting by the user. Incidentally, in this case, the set value of the language setting stored in the set value storage unit 21 remains at the default value, for example.

In contrast, when the user has selected to make the language setting, the power-on processing unit 12 obtains a positive result in the step SP31 and advances to step SP32. In the step SP32, the power-on processing unit 12 makes the language setting. Specifically, the power-on processing unit 12 causes the operation panel unit 11 to display a screen requiring the user to input or select the set value of the language setting, and acquires the set value of the language setting inputted or selected by the user by operating the operation panel unit 11. Then, the power-on processing unit 12 feeds the acquired set value of the language setting to the language setting unit 17. The language setting unit 17 stores the set value fed thereto in the set value storage unit 21 as the set value of the language setting.

In the subsequent step SP33, the power-on processing unit 12 inquires of the user whether or not to make the region setting. Specifically, the power-on processing unit 12 causes the operation panel unit 11 to display a screen for requiring the user to select whether or not to make the region setting, and determines whether the user has selected to make the region setting or selected not to make the region setting based on an operation performed on the operation panel unit 11.

Here, when the user has selected not to make the region setting, the power-on processing unit 12 obtains a negative result in the step SP33 and advances to step SP35 while omitting the region setting by the user. Incidentally, in this case, the set value of the region setting stored in the set value storage unit 21 remains at the default value, for example.

In contrast, when the user has selected to make the region setting, the power-on processing unit 12 obtains a positive result in the step SP33 and advances to step SP34. In the step SP34, the power-on processing unit 12 makes the region setting. Specifically, the power-on processing unit 12 causes the operation panel unit 11 to display a screen requiring the user to input or select the set value of the region setting, and acquires the set value of the region setting inputted or selected by the user by operating the operation panel unit 11. Then, the power-on processing unit 12 feeds the acquired set value of the region setting to the region setting unit 18. The region setting unit 18 stores the set value fed thereto in the set value storage unit 21 as the set value of the region setting.

In the subsequent step SP35, the power-on processing unit 12 inquires of the user whether or not to make the network setting. Specifically, the power-on processing unit 12 causes the operation panel unit 11 to display a screen for requiring the user to select whether or not to make the network setting, and determines whether the user has selected to make the network setting or selected not to make the network setting based on an operation performed on the operation panel unit 11.

Here, when the user has selected not to make the network setting, the power-on processing unit 12 obtains a negative result in the step SP35 and ends the initialization-time setting change process while omitting the network setting by the user. Incidentally, in this case, the set value of the network setting stored in the set value storage unit 21 remains at the default value, for example.

In contrast, when the user has selected to make the network setting, the power-on processing unit 12 obtains a positive result in the step SP35 and advances to step SP36. In the step SP36, the power-on processing unit 12 makes the network setting. Specifically, the power-on processing unit 12 causes the operation panel unit 11 to display a screen requiring the user to input or select the set value of the network setting, and acquires the set value of the network setting inputted or selected by the user by operating the operation panel unit 11. Then, the power-on processing unit 12 feeds the acquired set value of the network setting to the network setting unit 19. The network setting unit 19 stores the set value fed thereto in the set value storage unit 21 as the set value of the network setting. The initialization-time setting change made in the step SP23 in FIG. 2 is as described above.

Figure 2:
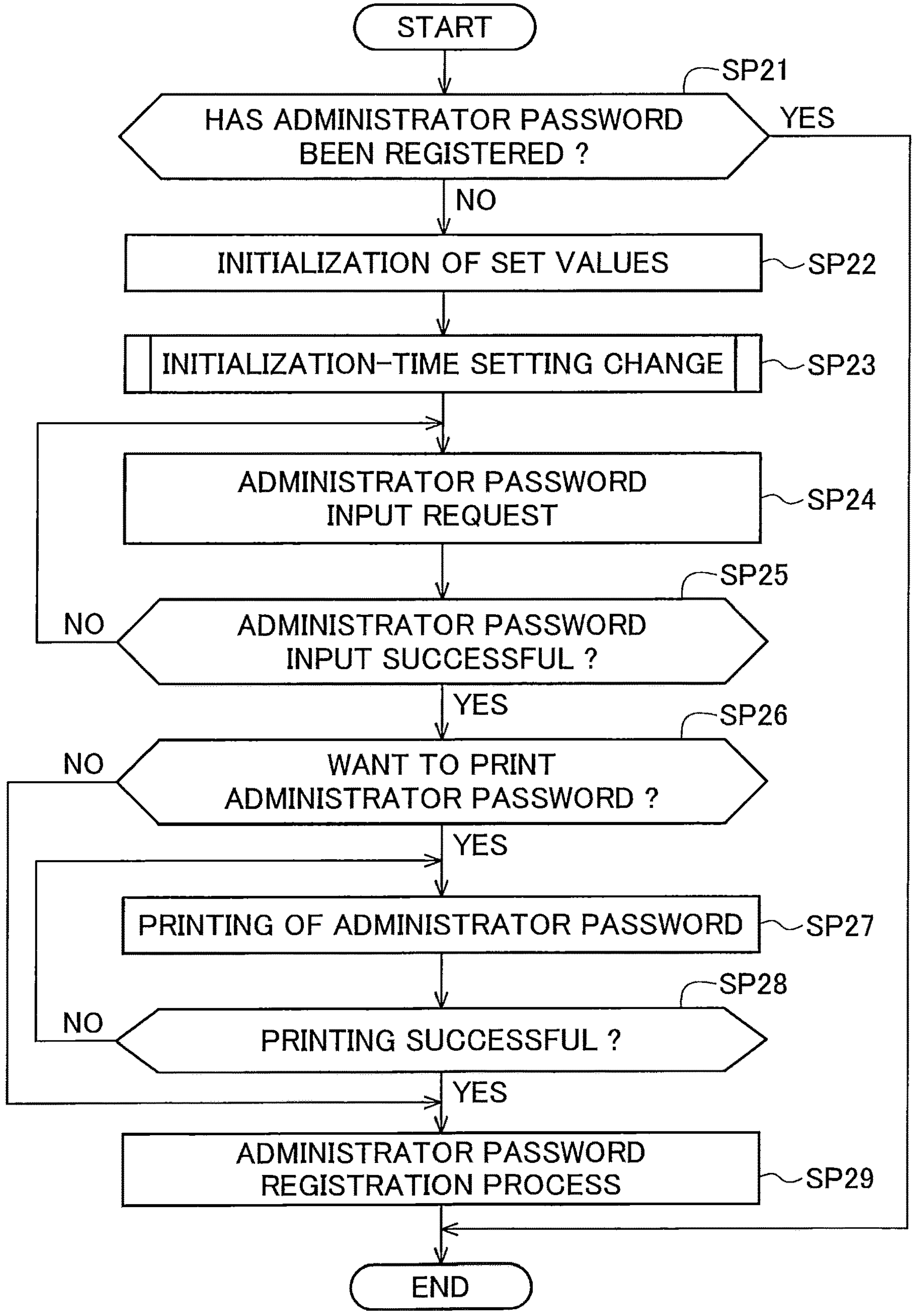
FIG. 2 is a flowchart showing an operating procedure of the image forming device according to the first embodiment at the time of turning on the power.

When the initialization-time setting change is finished, the power-on processing unit 12 advances to step SP24 in FIG. 2. In the step SP24, the power-on processing unit 12 makes an administrator password setting (input) request. Incidentally, while the setting by the user can be omitted in the image forming device 1 in regard to the language setting, the region setting and the network setting among the various settings as mentioned earlier, the setting by the user cannot be omitted in regard to the setting of the administrator password (namely, the user is necessarily required to make the administrator password setting). Specifically, the power-on processing unit 12 causes the operation panel unit 11 to display a screen requiring the user to input the administrator password, and acquires a character string as the administrator password inputted by the user by operating the operation panel unit 11.

In the subsequent step SP25, the power-on processing unit 12 determines whether or not the inputting of the administrator password succeeded. Specifically, for the administrator password, conditions such as a necessary number of characters and usable character types can be designated based on security policy, and it is determined that the inputting of the administrator password is successful if the inputted administrator password satisfies the conditions.

Thus, when the character string inputted by the user as the administrator password does not satisfy the designated conditions, the power-on processing unit 12 determines that the inputting of the administrator password failed, obtains a negative result in the step SP25, returns to the step SP24, and makes the administrator password input request again.

In contrast, when the character string inputted by the user as the administrator password satisfies the designated conditions, the power-on processing unit 12 determines that the inputting of the administrator password succeeded, obtains a positive result in the step SP25, and advances to step SP26.

In the step SP26, the power-on processing unit 12 inquires of the user whether or not to execute the printing of the administrator password. Specifically, the power-on processing unit 12 causes the operation panel unit 11 to display a screen for requiring the user to select whether or not to execute the printing of the administrator password, and determines whether the user has selected to execute the printing of the administrator password or selected not to execute the printing of the administrator password based on an operation performed on the operation panel unit 11.

Here, when the user has selected not to execute the printing of the administrator password, the power-on processing unit 12 obtains a negative result in the step SP26 and advances to step SP29 while omitting the printing of the administrator password. In the step SP29, the power-on processing unit 12 executes an administrator password registration process. Specifically, the power-on processing unit 12 processes the administrator password inputted by the user into data that is irreversible and undisclosed to users by using irreversible encryption such as hashing. Then, the power-on processing unit 12 provides the administrator password after undergoing the data processing (in this case, the administrator password after undergoing the irreversible encryption) to the administrator password registration modification unit 16. The administrator password registration modification unit 16 registers (stores) the administrator password after undergoing the data processing in the security DB unit 20 as administrator password information. In the case where the user has selected not to execute the printing of the administrator password, the administrator password inputted by the user is applied to the image forming device 1 (in other words, the image forming device 1 is made usable in the administrator mode) by this step SP29.

In contrast, when the user has selected to execute the printing of the administrator password, the power-on processing unit 12 obtains a positive result in the step SP26 and advances to step SP27. In the step SP27, the power-on processing unit 12 executes an administrator password printing process. Specifically, the power-on processing unit 12 feeds an administrator password printing request to the administrator password medium recording unit 13 together with the administrator password inputted by the user and before the data processing (in this example, before executing the irreversible encryption).

Upon receiving the administrator password printing request together with the administrator password from the power-on processing unit 12, the administrator password medium recording unit 13 generates image data for the administrator password printing by adding the administrator password inputted by the user to image data generated in a prescribed format and previously stored in the set value storage unit 21, for example, and feeds the generated image data for the administrator password printing to the printing unit 14.

Figure 4:
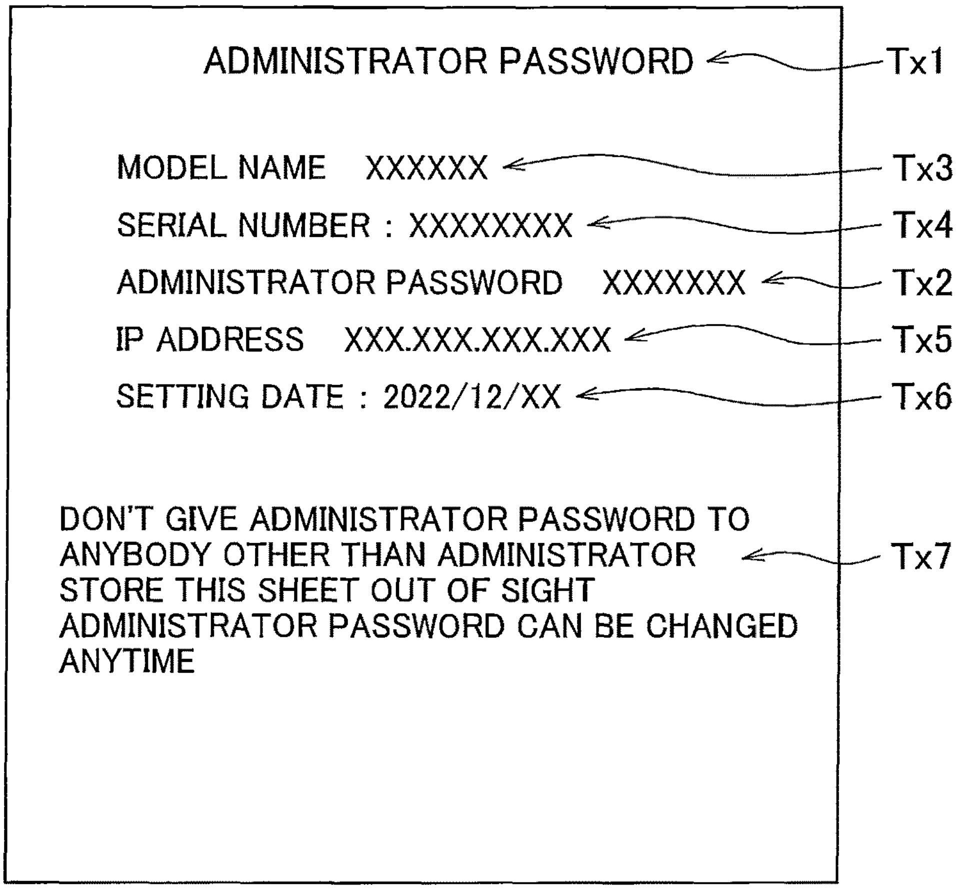
FIG. 4 is a diagram showing the configuration of image data for administrator password printing according to the first embodiment.

Here, the configuration of the image data for the administrator password printing is shown in FIG. 4. As shown in FIG. 4, a title (e.g., "ADMINISTRATOR PASSWORD") Tx1, the administrator password Tx2, identification information on the image forming device 1 including a model name Tx3, a serial number Tx4 and a IP address Tx5, a setting date Tx6 of the administrator password, and precautions Tx7 regarding the administrator password are described as text information in the image data for the administrator password printing.

Incidentally, the administrator password inputted by the user is described as the administrator password Tx2 in this image data. Further, the identification information on the image forming device 1 has been stored in the set value storage unit 21, for example.

Upon receiving such image data for the administrator password printing, the printing unit 14 executes the printing on a print sheet based on the image data. In this case, the printing unit 14 determines whether the printing has been executed normally or not based on the result of the sensing by the ejection sensor 14*a* and replies to the administrator password medium recording unit 13 with the determination result. Here, the administrator password medium recording unit 13 feeds the determination result to the power-on processing unit 12.

Returning to FIG. 2, in the subsequent step SP28, the power-on processing unit 12 determines whether the printing succeeded or not (in this case, whether or not the print sheet is in the state in which it can be carried away from the image forming device 1) based on the determination result received from the administrator password medium recording unit 13. Here, when the received determination result indicates that the printing has not been executed normally, the power-on processing unit 12 determines that the printing did not finish normally, returns to the step SP27, and feeds the administrator password printing request to the administrator password medium recording unit 13 again.

In contrast, when the received determination result indicates that the printing has been executed normally, the power-on processing unit 12 determines that the printing finished normally and advances to the step SP29. As above, the power-on processing unit 12 is configured to repeatedly feed the administrator password printing request to the administrator password medium recording unit 13 until the printing of the administrator password succeeds. Incidentally, it is also possible in this case to limit the number of repetitions to a certain number of times such as three times, for example. Here, when the printing of the administrator password does not succeed even when the number of repetitions has reached the limitation, the power-on processing unit 12 causes the operation panel unit 11 to display a print error message, for example, and stops the power-on process.

In the step SP29, the power-on processing unit 12 executes the above-described administrator password registration process. In the case where the user has selected to execute the printing of the administrator password, the administrator password inputted by the user is applied to the image forming device 1 (in other words, the image forming device 1 is made usable in the administrator mode) by this step SP29.

As above, in the image forming device 1, when the user has selected to execute the printing of the administrator password, the administrator password is applied to the image forming device 1 after the printing is finished normally.

Therefore, the administrator password remains unregistered when the user sets (inputs) the administrator password and thereafter the power of the image forming device 1 is turned off and the process is interrupted due to a power outage or the like before or in the middle of the printing of the administrator password, for example. In this case, since the administrator password is still unregistered when the power of the image forming device 1 is turned on next, the image forming device 1 executes the initialization of the various set values and then requests the user again to set (input) the administrator password. The operation of the image forming device 1 at the time of turning on the power is as described above.

1-3. Summary and Effect

As described above, in the first embodiment, the image forming device 1 is provided with the operation panel unit 11, the power-on processing unit 12, the administrator password medium recording unit 13, the printing unit 14, and the administrator password registration modification unit 16. The operation panel unit 11 functions as a password input unit for inputting the administrator password to the image forming device 1 as a target device. The power-on processing unit 12, the administrator password medium recording unit 13 and the printing unit 14 function as a recording control unit that causes the inputted administrator password to be recorded (printed) on a print sheet as a medium separate from the image forming device 1. The administrator password registration modification unit 16 functions as a password application unit that applies (i.e., validates) the inputted administrator password to the image forming device 1 by registering the inputted administrator password in the security DB unit 20 when the printing of the administrator password on the print sheet is finished.

Incidentally, in the first embodiment, the power-on processing unit 12 and the administrator password medium recording unit 13 are referred to also as a recording processing unit, and the printing unit 14 is referred to also as a recording execution unit.

The recording processing unit causes the recording execution unit to execute the recording of the administrator password.

As above, in the first embodiment, the administrator password inputted to the image forming device 1 is printed on a print sheet and thereafter applied to the image forming device 1, and thus the user can prevent the forgetting of the administrator password by checking the administrator password printed on the print sheet. As described above, according to the first embodiment, the convenience of the password management can be improved.

Further, in the first embodiment, the power-on processing unit 12, the administrator password medium recording unit 13 and the printing unit 14 are configured to print the administrator password inputted by the user only when the user has selected to print the administrator password. By this method, in the first embodiment, it is possible, for example, to avoid a situation where the user does not notice that the administrator password has been printed and the print (print sheet) with the administrator password is left on the stacker of the image forming device 1.

Furthermore, in the first embodiment, in the case where the user has selected to print the administrator password, the administrator password inputted by the user is applied to the image forming device 1 and the use of the image forming device 1 in the administrator mode is made possible after the power-on processing unit 12, the administrator password medium recording unit 13 and the printing unit 14 confirm that the printing of the administrator password finished normally (in other words, the print sheet with the administrator password printed thereon has been ejected to the stacker and reached the state in which it can be carried away from the image forming device 1) based on the result of the sensing by the ejection sensor **14*a* provided on the conveyance path. In other words, when the printing of the administrator password has not finished normally (e.g., when the print sheet with the administrator password printed thereon has not been ejected to the stacker and is in the state in which it cannot be carried away from the image forming device 1), the administrator password inputted by the user is not applied to the image forming device 1**.

By this method, in the first embodiment, it is possible to avoid a situation where the administrator password is applied to the image forming device 1 without being printed even though the user has selected to print the administrator password.

Moreover, in the first embodiment, the administrator password remains unregistered when the process is interrupted before finishing the printing of the administrator password due to the turning off of the power of the image forming device 1 caused by a power outage or the like. In this case, when the power of the image forming device 1 is turned on next, the power-on processing unit 12, the administrator password medium recording unit 13 and the printing unit 14 request the user again to input the administrator password.

By this method, in the first embodiment, it is possible to avoid a situation where the user forgets to set the administrator password.

2. Second Embodiment

Next, a second embodiment will be described below. In the first embodiment, the method of printing on a print sheet was employed as a method for recording the administrator password inputted by the user in/on a medium separate from the image forming device 1. In the second embodiment, a method of recording the administrator password inputted by the user in the USB memory 25, a method of recording the administrator password inputted by the user in the communication terminal 26 by transmitting the administrator password to the communication terminal 26 by the NFC communication, or a method of recording the administrator password inputted by the user in the communication terminal 26 by displaying the administrator password on the operation panel unit 11 and photographing the displayed administrator password with the communication terminal 26 can be employed as another method, and this feature is different from that in the first embodiment.

Specifically, the second embodiment differs from the first embodiment in the operation in the step SP26 to the step SP28 as a part to record the administrator password in/on the medium in the operation at the time of turning on the power shown in FIG. 2.

Thus, the description here will be given mainly on the operation of recording the administrator password in/on the medium at the time of turning on the power and the configuration of the communication terminal 26 as one of destinations of the recording of the administrator password.

2-1. Configuration of Communication Terminal

Figure 5:
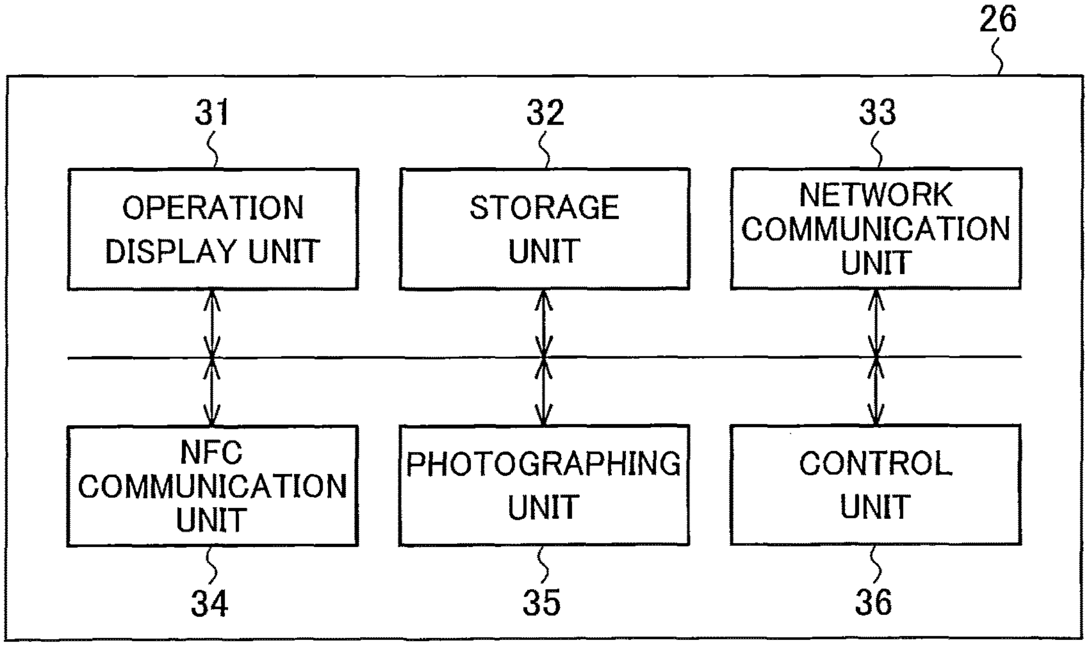
FIG. 5 is a block diagram showing the functional configuration of a communication terminal according to a second embodiment.

First, the configuration of the communication terminal 26 will be described briefly below by using FIG. 5. The communication terminal 26 is a smartphone, for example, and includes an operation display unit 31, a storage unit 32, a network communication unit 33, an NFC communication unit 34, a photographing unit 35 and a control unit 36.

The operation display unit 31 is formed with an operation unit such as switches, keys, buttons, or the like for letting the user issue commands to the communication terminal 26 and a display unit such as a display for displaying various screens. The operation display unit 31 may be formed with a touch panel.

The storage unit 32 is a nonvolatile memory or the like, and stores image data obtained by the photographing by the photographing unit 35, image data received from the image forming device 1, various applications to be executed by the control unit 36, and so forth, for example. The network communication unit 33 is a network communication interface (I/F) that connects to the network such as a LAN, for example. The NFC communication unit 34 is a short-range wireless communication I/F that executes the short-range wireless communication according to NFC with the image forming device 1, for example. The photographing unit 35 includes a camera, and photographs the administrator password displayed on the operation panel unit 11 of the image forming device 1, for example. The control unit 36 includes a CPU, a RAM and a ROM, for example, and controls each unit of the communication terminal 26. The configuration of the communication terminal 26 is as described above.

2-2. Operation of Recording Administrator Password in/on Medium

Next, a description will be given of the operation of recording the administrator password in/on the medium included in the operation of the image forming device 1 at the time of turning on the power. As described in the first embodiment, the power-on processing unit 12 of the image forming device 1 gets the user to input or select the various set values including the administrator password if the administrator password is still unregistered at the time of turning on the power.

Thereafter, the power-on processing unit 12 inquires of the user whether or not to record the administrator password in/on the medium. Specifically, the power-on processing unit 12 causes the operation panel unit 11 to display a screen for requiring the user to select whether or not to execute the recording of the administrator password in/on the medium, and determines whether the user has selected to execute or not to execute the recording of the administrator password in/on the medium based on an operation performed on the operation panel unit 11.

Here, when the user has selected to record the administrator password in/on the medium, the power-on processing unit 12 subsequently requires the user to select a method for recording the administrator password in/on the medium. Specifically, the power-on processing unit 12 causes the operation panel unit 11 to display a screen for requiring the user to select the method for recording the administrator password in/on the medium, and determines which method has been selected by the user based on an operation performed on the operation panel unit 11. As methods for recording the administrator password in/on the medium, there are four methods as mentioned earlier: the method of printing the administrator password on a print sheet, the method of recording the administrator password in the USB memory 25, the method of recording the administrator password in the communication terminal 26 by use of the NFC communication, and the method of recording the administrator password in the communication terminal 26 by photographing the displayed administrator password with the communication terminal 26.

Incidentally, when the user has selected not to record the administrator password in/on the medium, the power-on processing unit 12 performs data processing on the administrator password inputted by the user and causes the administrator password registration modification unit 16 to register the administrator password after undergoing the data processing in the security DB unit 20 as the administrator password information.

Here, the operation when the method for recording the administrator password in/on the medium has been selected by the user will be described below in regard to each selected method. Incidentally, the method of printing the administrator password on a print sheet is the same as that in the first embodiment, and thus repeated description thereof is omitted here.

First, the operation when the method of recording the administrator password in the USB memory 25 has been selected will be described below. In this case, the power-on processing unit 12 executes a process of recording the administrator password in the USB memory 25. Specifically, the power-on processing unit 12 feeds a request for recording the administrator password in the USB memory 25 to the administrator password medium recording unit 13 together with the administrator password inputted by the user to which the data processing (in this example, the irreversible encryption) is not executed.

Upon receiving the request for recording the administrator password in the USB memory 25 together with the administrator password from the power-on processing unit 12, the administrator password medium recording unit 13 generates image data for recording the administrator password shown in FIG. 4 by adding the administrator password inputted by the user to image data generated in a predetermined format and stored in the set value storage unit 21, for example, and records the generated image data in the USB memory 25 connected to the USB I/F unit 23. Incidentally, when recording the administrator password in the USB memory 25, it is not necessary to generate the image data, but it is also possible to record the administrator password as text data, for example.

In the image forming device 1, when an operation for safely removing the USB memory 25 connected to the USB I/F unit 23 is performed by the user, access to the USB memory 25 is ended and that makes it possible to safely remove and carried away the USB memory 25. Therefore, after recording the image data for recording the administrator password in the USB memory 25 is completed, the power-on processing unit 12 displays a message prompting the user to remove the USB memory 25, for example, on the operation panel unit 11, and when the operation for safely removing the USB memory 25 is performed on the operation panel unit 11, determines that the administrator password has been normally recorded in the USB memory 25 and the USB memory 25 has reached the state in which it can be carried away, performs the data processing on the administrator password inputted by the user, and causes the administrator password registration modification unit 16 to register (store) the administrator password after undergoing the data processing in the security DB unit 20 as the administrator password information. At this time point, the administrator password inputted by the user is applied to the image forming device 1, and the image forming device 1 becomes usable in the administrator mode.

In other words, the power-on processing unit 12 is configured not to apply the administrator password to the image forming device 1 until the operation for safely removing the USB memory 25 is performed on the operation panel unit 11 after recording the image data for recording the administrator password in the USB memory 25 is completed. Incidentally, it is also possible to put a limitation on the time until the operation for safely removing the USB memory 25 is performed after the image data for recording the administrator password is recorded in the USB memory 25. Here, when the operation for safely removing the USB memory 25 is not performed within the time limit, the power-on processing unit 12 displays a recording error message on the operation panel unit 11, for example, and interrupts the power-on process. The operation when the method of recording the administrator password in the USB memory 25 has been selected is as described above.

Next, the operation when the method of recording the administrator password in the communication terminal 26 by use of the NFC communication has been selected will be described below. In this case, the power-on processing unit 12 executes a process of recording the administrator password in the communication terminal 26 by use of the NFC communication. Specifically, the power-on processing unit 12 provides a request for recording the administrator password by use of the NFC communication to the administrator password medium recording unit 13 together with the administrator password inputted by the user to which the data processing (in this example, the irreversible encryption) is not executed.

Upon receiving the request for recording the administrator password by use of the NFC communication together with the administrator password from the power-on processing unit 12, the administrator password medium recording unit 13 generates the image data for recording the administrator password shown in FIG. 4 by adding the administrator password inputted by the user to image data generated in a prescribed format and stored in the set value storage unit 21, for example, and transmits the generated image data to the communication terminal 26 via the NFC communication unit 24. Incidentally, at that time, the power-on processing unit 12 or the administrator password medium recording unit 13 may cause the operation panel unit 11 to display a screen prompting the user to hold the communication terminal 26 in proximity of a prescribed part of the image forming device 1. In this case, the conversion of the administrator password to image data is not necessarily essential; it is also possible to transmit the administrator password as text data in a smaller data size, for example.

Upon receiving the image data for recording the administrator password from the image forming device 1 via the NFC communication unit 34, the control unit 36 of the communication terminal 26 stores the image data in the storage unit 32 and notifies the image forming device 1 via the NFC communication unit 34 that the image data has been recorded, for example.

Upon receiving the notification that the image data (namely, the administrator password) has been recorded from the communication terminal 26 via the NFC communication unit 24, the power-on processing unit 12 of the image forming device 1 determines that the administrator password has been recorded normally, performs the data processing on the administrator password inputted by the user, and causes the administrator password registration modification unit 16 to register (store) the administrator password after undergoing the data processing in the security DB unit 20 as the administrator password information. At this time point, the administrator password inputted by the user is applied to the image forming device 1, and the image forming device 1 becomes usable in the administrator mode.

In other words, the power-on processing unit 12 is configured not to apply the administrator password to the image forming device 1 until the notification that the image data has been recorded is received from the communication terminal 26 after transmitting the image data for recording the administrator password to the communication terminal 26 via the NFC communication unit 24. Incidentally, it is also possible to put a limitation on the time until the notification that the image data has been recorded is received from the communication terminal 26 after the image data for recording the administrator password is transmitted to the communication terminal 26. Here, when the notification that the image data has been recorded is not received within the time limit, the power-on processing unit 12 displays a recording error message on the operation panel unit 11, for example, and interrupts the power-on process. The operation when the method of recording the administrator password in the communication terminal 26 by use of the NFC communication has been selected is as described above.

Next, the operation when the method of recording the administrator password in the communication terminal 26 by photographing the administrator password with the communication terminal 26 has been selected will be described below. In this case, the power-on processing unit 12 executes a process of recording the administrator password in the communication terminal 26 by photographing the administrator password with the communication terminal 26. Specifically, the power-on processing unit 12 feeds a request for recording the administrator password by use of photographing to the administrator password medium recording unit 13 together with the administrator password inputted by the user to which the data processing (in this example, the irreversible encryption) is not executed.

Upon receiving the request for recording the administrator password by use of photographing together with the administrator password from the power-on processing unit 12, the administrator password medium recording unit 13 generates the image data for recording the administrator password shown in FIG. 4 by adding the administrator password inputted by the user to image data generated in a predetermined format and stored in the set value storage unit 21, for example, and displays the generated image data on the operation panel unit 11. Incidentally, at that time, the power-on processing unit 12 or the administrator password medium recording unit 13 may cause the operation panel unit 11 to display a screen prompting the user to photograph the image data with the communication terminal 26, together with the image data for recording the administrator password. In this case, the conversion of the administrator password to image data is not necessarily essential; it is also possible to display the administrator password as text data, a two-dimensional code or the like, for example.

Here, the user activates a camera application, for example, by operating the operation display unit 31 of the communication terminal 26. Then, the user performs an operation of fitting the image data for recording the administrator password displayed on the image forming device 1 in a photographing range of the photographing unit 35 of the communication terminal 26 (in other words, fitting the image data in the photographing range displayed on the operation display unit 31) and pressing a photographing button displayed on the operation display unit 31. In response to this operation, the control unit 36 of the communication terminal 26 causes the photographing unit 35 to photograph the image data. Then, the control unit 36 records image data obtained as the result of the photographing by the photographing unit 35 in the storage unit 32. Further, at that time, the control unit 36 notifies the image forming device 1 via the network communication unit 33 or the NFC communication unit 34 that the image data for recording the administrator password has been recorded.

Upon receiving the notification that the image data (namely, the administrator password) has been recorded from the communication terminal 26 via the network communication unit 22 or the NFC communication unit 24, the power-on processing unit 12 of the image forming device 1 determines that the administrator password has been recorded normally, performs the data processing on the administrator password inputted by the user, and causes the administrator password registration modification unit 16 to register (store) the administrator password after undergoing the data processing in the security DB unit 20 as the administrator password information. At this time point, the administrator password inputted by the user is applied to the image forming device 1, and the image forming device 1 becomes usable in the administrator mode.

In other words, the power-on processing unit 12 is configured not to apply the administrator password to the image forming device 1 until the notification that the image data has been recorded is received from the communication terminal 26 after displaying the image data for recording the administrator password on the operation panel unit 11. Incidentally, it is also possible to put a limitation on the time until the notification that the image data has been recorded is received from the communication terminal 26 after the image data for recording the administrator password is displayed on the operation panel unit 11. Here, when the notification that the image data has been recorded is not received within the time limit, the power-on processing unit 12 displays a recording error message on the operation panel unit 11, for example, and interrupts the power-on process. The operation when the method of recording the administrator password in the communication terminal 26 by photographing the administrator password with the communication terminal 26 has been selected is as described above.

2-3. Summary and Effect

As described above, in the second embodiment, the user is required to select the method for recording the administrator password inputted by the user in/on a medium separate from the image forming device 1 out of the four methods (in other words, the user is required to select a medium in/on which the administrator password should be recorded). Then, in the case where the method of printing the administrator password on a print sheet has been selected, the administrator password inputted by the user is applied to the image forming device 1 after printing the administrator password on the print sheet similarly to the first embodiment.

Therefore, the inputted password is applied to the target device (made usable) after the password is recorded in/on a medium (e.g., a print sheet or a USB memory) separate from the target device, and thus the user can be prevented from forgetting the password by checking the password recorded in/on the medium.

In the case where the method of recording the administrator password in the USB memory 25 has been selected, the power-on processing unit 12 as the recording control unit, the administrator password medium recording unit 13 and the USB I/F unit 23 apply the administrator password inputted by the user to the image forming device 1 after recording the administrator password in the USB memory 25. By this method, the user can be prevented from forgetting the administrator password by checking the administrator password recorded in the USB memory 25, and the convenience of the password management can be improved.

Incidentally, in this case in the second embodiment, the USB I/F unit 23 is referred to also as the recording execution unit.

Further, in this case, the power-on processing unit 12 applies the administrator password inputted by the user to the image forming device 1 when the operation for safely removing the USB memory 25 is performed on the operation panel unit 11 after the administrator password is recorded in the USB memory 25. In other words, the administrator password inputted by the user is not applied to the image forming device 1 when the operation for safely removing the USB memory 25 has not been performed on the operation panel unit 11.

By this method, in the second embodiment, it is possible to avoid a situation where the administrator password is applied to the image forming device 1 while the USB memory 25 is still attached to the image forming device 1 (in other words, in a state in which there is a possibility that the USB memory 25 is taken out by a third party other than the user) even though the user has selected to record the administrator password in the USB memory 25.

In the case where the method of recording the administrator password in the communication terminal 26 as a communication device by use of the NFC communication has been selected, the power-on processing unit 12 as the recording control unit, the administrator password medium recording unit 13 and the NFC communication unit 24 apply the administrator password inputted by the user to the image forming device 1 after the administrator password is transmitted to the communication terminal 26 by the NFC communication and recorded in the communication terminal 26. By this method, the user can be prevented from forgetting the administrator password by checking the administrator password recorded in the communication terminal 26, and the convenience of the password management can be improved.

Incidentally, in this case in the second embodiment, the NFC communication unit 24 is referred to also as the recording execution unit.

Further, in this case, the power-on processing unit 12 applies the administrator password set (inputted) by the user to the image forming device 1 when the notification that the administrator password has been recorded is received from the communication terminal 26 via the NFC communication unit 24. In other words, the administrator password inputted by the user is not applied to the image forming device 1 when the notification that the administrator password has been recorded has not been received from the communication terminal 26.

By this method, in the second embodiment, it is possible to avoid a situation where the administrator password is applied to the image forming device 1 even though the administrator password has not been recorded in the communication terminal 26.

In the case where the method of recording the administrator password in the communication terminal 26 by photographing the administrator password with the communication terminal 26 as a photographing device has been selected, the power-on processing unit 12 as the recording control unit and the administrator password medium recording unit 13 apply the administrator password inputted by the user to the image forming device 1 after the administrator password is displayed on the operation panel unit 11 and recorded in the communication terminal 26 by photographing the displayed administrator password with the communication terminal 26. By this method, the user can be prevented from forgetting the administrator password by checking the administrator password recorded in the communication terminal 26, and the convenience of the password management can be improved.

Incidentally, in this case in the second embodiment, the display unit of the operation panel unit 11 is referred to also as the recording execution unit.

Further, in this case, the power-on processing unit 12 applies the administrator password set (inputted) by the user to the image forming device 1 when the notification that the administrator password has been recorded is received from the communication terminal 26 via the network communication unit 22 or the NFC communication unit 24. In other words, the administrator password inputted by the user is not applied to the image forming device 1 when the notification that the administrator password has been recorded has not been received from the communication terminal 26.

By this method, in the second embodiment, it is possible to avoid a situation where the administrator password is applied to the image forming device 1 even though the administrator password has not been recorded in the communication terminal 26. Incidentally, while the user is required to select the method for recording the administrator password inputted by the user in/on a medium separate from the image forming device 1 in the second embodiment, the second embodiment is not limited to this example; it is also possible to require the user to select a medium in/on which the administrator password inputted by the user should be recorded. In this case, when a print sheet or the USB memory 25 is selected as the recording medium, for example, the administrator password may be recorded in/on the print sheet or the USB memory 25 by the method described earlier in regard to each medium. When the communication terminal 26 is selected as the recording medium, for example, the administrator password may be recorded in the communication terminal 26 by one of the method by use of the NFC communication and the method by use of photographing.

3. Further Embodiments

3-1. First Further Embodiment

Incidentally, in the first embodiment described earlier, the administrator password is recorded on a print sheet as a medium separate from the image forming device 1 only when the user inputs the administrator password and then selects to record (print) the administrator password. However, the method is not limited to this example and it is also possible to automatically record the administrator password on a print sheet as a medium separate from the image forming device 1 after the administrator password is inputted by the user. The same goes for the second embodiment and it is also possible to automatically record the administrator password in/on a medium separate from the image forming device 1 by a method selected by the user after the method for recording the administrator password is selected by the user.

3-2. Second Further Embodiment

In the first embodiment described earlier, the administrator password is inputted by the user at the time of turning on the power of the image forming device 1. However, the method is not limited to this example and it is also possible to allow the user to change the administrator password not only at the time of turning on the power but also any time in order to periodically update the administrator password, for example. Also in this case, the administrator password may be printed on a print sheet just when the administrator password is inputted by the user. The same goes for the second embodiment.

3-3. Third Further Embodiment

While the administrator password is set by the user inputting of the administrator password in the first embodiment described earlier, the method is not limited to this example and it is also possible, for example, that, in place of the user, the image forming device 1 automatically generate and input an administrator password to set the administrator password. In this case, the power-on processing unit 12 causes the operation panel unit 11 to display a screen on which the user can select whether to directly input the administrator password or input the administrator password by means of the automatic generation, for example. Then, the power-on processing unit 12 may allow the user to input the administrator password when the user selected to directly input the administrator password. In order to reduce the user's trouble of input, the power-on processing unit 12 may input the administrator password as a random pattern or the result of the automatic generation by use of a certain arithmetic rule when the user selected to input the administrator password by means of the automatic generation. The same goes for the second embodiment.

3-4. Fourth Further Embodiment

In the second embodiment described earlier, in the case where the method of recording the administrator password in the communication terminal 26 by photographing the administrator password with the communication terminal 26 has been selected by the user, when the notification that the administrator password has been recorded is received from the communication terminal 26, the power-on processing unit 12 of the image forming device 1 determines that the recording of the administrator password succeeded and applies the administrator password to the image forming device 1.

The method is not limited to this example and in the case where the method of recording the administrator password in the communication terminal 26 by photographing the administrator password with the communication terminal 26 has been selected by the user, the power-on processing unit 12 of the image forming device 1 converts the administrator password (or the administrator password and the identification information on the image forming device 1) to a two-dimensional code and displays the two-dimensional code on the operation panel unit 11, for example.

The user photographs the two-dimensional code displayed on the operation panel unit 11 with the communication terminal 26. Here, the control unit 36 of the communication terminal 26 obtains the administrator password by decoding the two-dimensional code photographed by the photographing unit 35 and transmits the administrator password to the image forming device 1 via the network communication unit 33 or the NFC communication unit 34.

Upon receiving the administrator password from the communication terminal 26 via the network communication unit 22 or the NFC communication unit 24, the power-on processing unit 12 of the image forming device 1 may compare the administrator password (namely, the photographed administrator password) with the administrator password inputted by the user, determine that the recording of the administrator password succeeded if the administrator passwords coincide with each other, and apply the administrator password inputted by the user to the image forming device 1.

3-5. Fifth Further Embodiment

In the first embodiment described earlier, the security DB unit 20 is provided separately from the set value storage unit 21 and the administrator password after undergoing the data processing such as the irreversible encryption is registered in the security DB unit 20. The method is not limited to this example and it is also possible, for example, to provide one storage unit instead of the set value storage unit 21 and the security DB unit 20 to store the various set values and the administrator password after undergoing the data processing. The same goes for the second embodiment.

3-6. Sixth Further Embodiment

While the embodiments described above were applied to the image forming device 1, the application of the embodiments is not limited to the image forming device 1; the embodiments are applicable to various types of information processing devices requiring the setting of a password such as the administrator password and capable of recording the password in/on a separate medium. For example, the embodiments are applicable to multi-function peripherals, servers, game machines, smartphones, and so forth.

3-7. Seventh Further Embodiment

Further, the present disclosure is not limited to the embodiments described above. Namely, the scope of application of the present disclosure ranges also to embodiments obtained by arbitrarily combining parts or wholes of some of the above-described embodiments and embodiments obtained by extracting parts from the above-described embodiments.

Figure 6A:
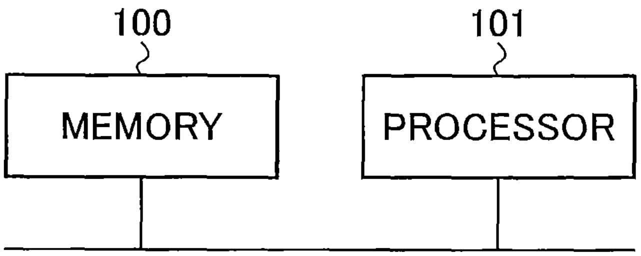
FIGS. 6A and 6B are block diagrams showing hardware configuration examples.

Part or all of the power-on processing unit 12, the administrator password medium recording unit 13, the setting initialization unit 15, the language setting unit 17, the region setting unit 18, the network setting unit 19 and the administrator password registration modification unit 16 in the above-described image forming devices 1 can be formed with, for example, a memory 100 and a processor 101 such as a central processing unit (CPU) that executes a program stored in the memory 100 as shown in FIG. 6A. Such a program may be provided via a network, or provided in the form of being stored in a record medium. Namely, such a program may be provided as a program product, for example.

Figure 6B:
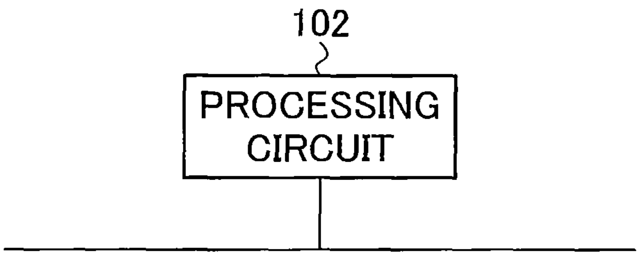

Further, part or all of the power-on processing unit 12, the administrator password medium recording unit 13, the setting initialization unit 15, the language setting unit 17, the region setting unit 18, the network setting unit 19 and the administrator password registration modification unit 16 can also be formed with, for example, a processing circuit 192 such as a single circuit, a combined circuit, a processor operating according to a program, a parallel processor operating according to a program, an application specific integrated circuit (ASIC) or a field-programmable gate array (FPGA) as shown in FIG. 6B.

As above, the power-on processing unit 12, the administrator password medium recording unit 13, the setting initialization unit 15, the language setting unit 17, the region setting unit 18, the network setting unit 19 and the administrator password registration modification unit 16 can be implemented by processing circuitry.

The operation panel unit 11 can be implemented by a display and an input I/F such as keybuttons. Incidentally, the operation panel unit 11 may also be implemented by a touch screen.

The security DB unit 20 and the set value storage unit 21 can be implemented by a nonvolatile memory or storage such as a hard disk drive (HDD) or a solid state drive (SSD).

Further, the network communication unit 22 can be implemented by a network communication I/F such as a network interface card (NIC) capable of performing communication via a network.

The USB I/F unit 23 can be implemented by a connection I/F according to USB.

The NFC communication unit 24 can be implemented by an NFC I/F as a communication I/F capable of performing NFC.

INDUSTRIAL APPLICABILITY

The present disclosure is widely applicable to devices such as a printer to be logged into by using the administrator password, for example.

DESCRIPTION OF REFERENCE CHARACTERS

1: image forming device, 11: operation panel unit, 12: power-on processing unit, 13: administrator password medium recording unit, 14: printing unit, 15: setting initialization unit, 16: administrator password registration modification unit, 17: language setting unit, 18: region setting unit, 19: network setting unit, 20: security DB unit, 21: set value storage unit, 22: network communication unit, 23: USB I/F unit, 24: NFC communication unit, 25: USB memory, 26: communication terminal, 31: operation display unit, 32: storage unit, 33: network communication unit, 34: NFC communication unit, 35: photographing unit, 36: control unit

What is claimed is:

1. An information processing device comprising:

an input interface (I/F);

a nonvolatile memory or storage; and processing circuitry, wherein the processing circuitry is configured to determine whether a password has been recorded in the nonvolatile memory or storage;

to initialize set values of the information processing device when the password has not been recorded in the nonvolatile memory or storage;

to receive an input of new set values and a new password via the input I/F;

to cause the new password to be recorded in/on a medium being portable; and to record the new password in the nonvolatile memory or storage and apply the new set values when the recording of the new password in/on the medium is completed.

2. The information processing device according to claim 1, wherein the processing circuitry is configured to make the new password usable in a predetermined condition when the new password inputted to the information processing device to be used in the predetermined condition has been recorded normally in/on the medium, and make the new password unusable in the predetermined condition when the new password has not been recorded normally in/on the medium.

3. The information processing device according to claim 2, wherein the processing circuitry is configured to determine that the new password has been recorded normally in/on the medium when the medium can be carried away from the information processing device after the new password inputted to the information processing device is recorded in/on the medium by the information processing device.

4. The information processing device according to claim 2, further comprising a printing main body configured to record the new password on the medium by conveying the medium and printing the new password on the medium according to a command from the processing circuitry and include a sensor that senses the conveyed medium after printing on the medium, wherein the processing circuitry is configured to determine that the new password has been recorded normally in/on the medium based on a result of the sensing by the sensor.

5. The information processing device according to claim 2, further comprising a connection I/F configured to record the new password in the medium connected thereto, wherein the processing circuitry is configured to determine that the new password has been recorded normally in/on the medium if an operation for safely removing the medium recording the new password from the connection I/F has been performed on the input I/F.

6. The information processing device according to claim 2, further comprising a wireless communication I/F configured to transmit the new password to a communication device capable of communication with the information processing device and thereby cause the new password to be recorded in/on the medium provided in the communication device, wherein the processing circuitry is configured to determine that the new password has been recorded normally in/on the medium when a notification that the new password has been recorded is received from the communication device via the wireless communication I/F.

7. The information processing device according to claim 2, further comprising a display configured to display the new password so that the displayed password is recorded in/on the medium provided in a photographing device by photographing the displayed password with the photographing device, wherein the processing circuitry is configured to determine that the new password has been recorded normally in/on the medium by receiving a notification that the new password has been recorded from the photographing device.

8. The information processing device according to claim 1, wherein when a user has selected via the input I/F to record the new password in/on the medium, the processing circuitry is configured to cause the new password to be recorded in/on the medium and apply the new password when the recording of the new password in/on the medium is completed, and when the user has selected via the input I/F not to record the new password in/on the medium, the processing circuitry is not configured to cause the new password to be recorded in/on the medium and is configured to apply the new password.

9. The information processing device according to claim 1, wherein the input I/F is configured to cause a user to select the medium in/on which the new password is to be recorded, and the processing circuitry is configured to cause the new password to be recorded in/on the selected medium.

10. A password setting method for an information processing device having a nonvolatile memory or storage, the password setting method comprising:

determining whether the password has been recorded in the nonvolatile memory or storage;

initializing set values of the information processing device when the password has not been recorded in the nonvolatile memory or the storage;

receiving an input of new set values and a new password;

recording the new password in/on a medium being portable; and applying the new set values when the recording of the new password in/on the medium is completed.

11. The information processing device according to claim 1, wherein the processing circuitry is configured to initialize the set values when the password has not been recorded in the nonvolatile memory or the storage on turning on power of the information processing device.

12. An information processing device comprising:

an input interface (I/F);

a nonvolatile memory or storage; and processing circuitry, wherein the processing circuitry is configured to receive an input of a new password via the input I/F;

the processing circuitry is configured to cause the new password to be recorded in/on the medium and apply the new password when the recording of the new password in/on the medium is completed, if a user has selected via the input I/F to record the new password in/on the medium; and when a user has selected via the input I/F to record the new password in/on the medium, the processing circuitry is configured to cause the new password to be recorded in/on the medium and apply the new password when the recording of the new password in/on the medium is completed, and when the user has selected via the input I/F not to record the new password in/on the medium, the processing circuitry is not configured to cause the new password to be recorded in/on the medium and is configured to apply the new password.

13. The information processing device according to claim 12, wherein the processing circuitry is configured to make the new password usable in a predetermined condition when the new password inputted to the information processing device to be used in the predetermined condition has been recorded normally in/on the medium, and make the new password unusable in the predetermined condition when the new password has not been recorded normally in/on the medium.

14. The information processing device according to claim 13, wherein the processing circuitry is configured to determine that the new password has been recorded normally in/on the medium when the medium can be carried away from the information processing device after the new password inputted to the information processing device is recorded in/on the medium by the information processing device.

15. The information processing device according to claim 13, further comprising a printing main body configured to record the new password on the medium by conveying the medium and printing the new password on the medium according to a command from the processing circuitry and include a sensor that senses the conveyed medium after printing on the medium, wherein the processing circuitry is configured to determine that the new password has been recorded normally in/on the medium based on a result of the sensing by the sensor.

16. The information processing device according to claim 13, further comprising a connection I/F configured to record the new password in the medium connected thereto, wherein the processing circuitry is configured to determine that the new password has been recorded normally in/on the medium if an operation for safely removing the medium recording the new password from the connection I/F has been performed on the input I/F.

17. The information processing device according to claim 13, further comprising a wireless communication I/F configured to transmit the new password to a communication device capable of communication with the information processing device and thereby cause the new password to be recorded in/on the medium provided in the communication device, wherein the processing circuitry is configured to determine that the new password has been recorded normally in/on the medium when a notification that the new password has been recorded is received from the communication device via the wireless communication I/F.

18. The information processing device according to claim 13, further comprising a display configured to display the new password so that the displayed password is recorded in/on the medium provided in a photographing device by photographing the displayed password with the photographing device, wherein the processing circuitry is configured to determine that the new password has been recorded normally in/on the medium by receiving a notification that the new password has been recorded from the photographing device.

19. The information processing device according to claim 12, wherein the input I/F is configured to cause a user to select the medium in/on which the new password is to be recorded, and the processing circuitry is configured to cause the new password to be recorded in/on the selected medium.

20. The information processing device according to claim 12, further comprising a display, wherein the processing circuitry is configured to cause the display to display a screen on which the user is able to select whether to directly input the new password or input the new password by means of automatic generation, when directly inputting the new password is selected, the processing circuitry is configured to allow the user to input the new password via the input I/F, and when inputting the new password by means of the automatic generation is selected, the processing circuitry is configured to set, as the new password, a random pattern or a result of the automatic generation by use of a certain arithmetic rule.

* * * * *